UNITED STATES PATENT OFFICE 2,420,702

AMINO-ALIPHATIC HYDRAZINES AND PROCESS FOR MAKING SAME

James Gordon Napier Drewitt, London, and Donald Peter Young, Spondon, near Derby, England, assignors to British Celanese Limited, London, England, a company of Great Britain No Drawing. Application May 26, 1945, Serial No. 596,084. In Great Britain June 28, 1944

7 Claims. (Cl. 260—569)

This invention relates to the production of organic bases, and more particularly to the production of amino-hydrazines.

In accordance with the invention amino-hydrazines of the formula NH$_2$R.N$_2$H$_2$R′ are obtained by a process which involves reacting a substituted ester of the formula AN—R—X, AN being a diacylimido group, e. g. a diacetamido, succinimido or phthalimido group, X a radicle of a strong acid, e. g. a halogen, hydrogen sulphate or para-toluene sulphonate, and R an organic radicle, with a hydrazine of the formula R′—NH.NH$_2$, R′ being hydrogen or an organic radicle, e. g. a hydrocarbon or substituted hydrocarbon radicle or an acidyl radicle.

A very suitable diacylimido substituent for the ester AN—R—X is the phthalimido group. The course of the reaction in this case can probably be represented thus:

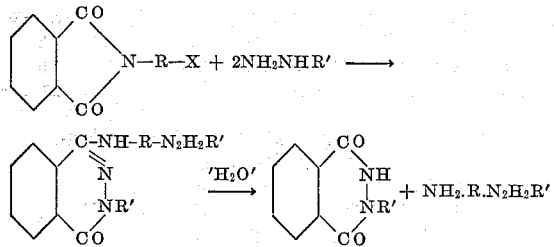

As indicated in the equation, the initial reaction with the hydrazine probably yields an intermediate hydrazino phthal-hydrazidine. The second phase of the reaction, i. e. the hydrolysis to a phthal-hydrazide and the amino-hydrazine, can be effected by treatment with a mild hydrolytic agent, e. g. aqueous mineral acid at 100° C. or less. The reaction can, however, often be carried to completion by mere prolongation of the reaction with the hydrazine.

The divalent radicle R may be a straight or branched chain alkyl or cycloalkyl radicle and may contain substituent groups, e. g. hydroxy groups, or hetero atoms or groups or aromatic radicles in the chain, e. g. —O—, —S— or the phenylene radicle. Further, the radicle R may be purely aromatic, in which case, unless the radicle contains electron-attracting groups, e. g. nitro, ortho or para to the radicle X, the low reactivity of the latter may necessitate more vigorous reaction conditions than when the radicle R is of the aliphatic type. The invention is however of special value for the production of di-primary aminoalkylhydrazines, such as can be obtained by reaction of a phthalimido alkylhalide with hydrazine.

The reaction is conveniently effected by warming the components in alcoholic or aqueous alcoholic solution or suspension, and in order to produce good yields of aminohydrazines of the type NH$_2$RN$_2$HR′ it is desirable to use a very large excess, e. g. up to 10 or 20 moles, of hydrazine or a mono-derivative thereof. In this way the possibility of side reactions leading, for example, to the production of more highly substituted hydrazines, is considerably reduced. In order to take up the acid liberated the reaction can be carried out in presence of alkali, for example sodium bicarbonate or sodium methoxide.

As indicated above the initial reaction with the hydrazine may give the intermedaite hydrazino-phthalhydrazidine or may lead directly to phthalhydrazide and the desired aminohydrazine. After this initial reaction it is preferred to remove the excess hydrazine before further working-up, e. g. by distillation under reduced pressure, or by filtration in those cases where the intermediate product separates. The final hydrolysis, if necessary, can be effected by warming with mineral acid, for example hydrochloric acid, and the amino-hydrazine can be isolated as the salt, e. g. the hydrochloride. Alternatively, the acid can be neutralized and the product distilled under reduced pressure or extracted with a suitable solvent, e. g. benzene. When using the last-mentioned expedient, it may be advantageous to make the reaction mixture strongly alkaline or to dissolve in it a large amount of a salt in order to facilitate the extraction. Final purification of the amino-hydrazine from traces of hydrazine can, if necessary, be effected by taking advantage of the fact that, as we have observed, on treating a mixture of hydrazine and organic hydrazine with benzaldehyde, e. g. in acid solution, the latter reacts preferentially with the hydrazine to give benzal azine. Again it is possible to make use of the very sparing solubility of hydrazine sulphate, particularly in alcoholic media. Purification can also be effected by fractional crystallisation of the salts with mineral acids or with organic acids. When handling the amino-hydrazine as the free base, it is advantageous to work as far as possible in an inert atmosphere, e. g. nitrogen or hydrogen, since the hydrazines, particularly the aliphatic hydrazines, are very sensitive to air oxidation. Further, it is desirable that distillation of the amino-hydrazine should be effected at as low a temperature as convenient in order to avoid thermal decomposition.

Examples of substituted esters which can be reacted in accordance with the invention are the 2-chloro-ethyl-, 3-chloro-propyl-, 4-chloro-butyl-, 6-chloro-hexyl-, 5-chloro-1-methyl-amyl-, 4-chloro-cyclohexyl-, ω-chloro-p-xylenyl-, 2-chlor-ethoxy-ethyl-phthalimides, and the corresponding bromo derivatives. These bodies can be prepared by reacting an excess of an aliphatic dihalide with potassium phthalimide or with phthalimide itself in presence of anhydrous alkali, e. g. potassium carbonate. This reaction is conveniently effected by heating the ingredients without a diluent at about 120–200° C. In some instances anhydrous alcohol or other anhydrous solvent for the dihalide can be used with advantage.

The invention is illustrated by the following examples, all parts by being by weight:

EXAMPLE 1

*Preparation of 6-chlorohexyl-phthalimide*

48 parts of potassium phthalimide and 120 parts of hexamethylene dichloride were heated at 200° C. with stirring under reflux in an atmosphere of nitrogen for 8 hours. 76.4 parts of dichloride were removed by distillation under reduced pressure and the residue was exhaustively extracted with light petroleum, B. 40–60° C. Concentration of the extract yielded 40 parts of crude 6-chlorohexyl phthalimide, from which on recrystallisation from light petroleum 32.5 parts of the pure body, as white shining crystalline plates, M. P. 39–40° C., were obtained. Extraction of the residue with chloroform yielded 4.2 parts of crude diphthalimido-hexane.

In a similar manner 6-bromohexyl phthalimide can be prepared from hexamethylene dibromide and potassium phthalimide. This product has M. P. 55–56°.

EXAMPLE 2

*Preparation of 6-aminohexyl-hydrazine*

23 parts of 6-chlorohexyl-phthalimide, 104 parts of 50% w/w alcoholic hydrazine hydrate solution and 80 parts of ethyl alcohol were warmed at 85° C. for 1¼ hours. The solution was then made acid by addition of 270 parts of 20% hydrochloric acid and refluxed for a further 1½ hours. After cooling, the precipitated phthalyl hydrazide, 13.8 parts, was filtered off. To the filtrate was added a further 110 parts of 36% hydrochloric acid and the liquor concentrated in vacuo, crops of hydrazine dihydrochloride being removed as they were formed. In all, 88 parts of hydrazine dihydrochloride were so obtained. The residue was dried by azeotroping off the last traces of moisture with benzene, when 16 parts of sticky solid remained. After three recrystallisations from alcoholic hydrogen chloride this gave 7.4 parts of 6-aminohexylhydrazine-dihydrochloride as colourless crystals, melting 125–8° C.

Having described our invention, what we desire to secure by Letters Patent is:

1. In the production of an amino-hydrazine of the formula $NH_2RNHNH_2$, the step which comprises reacting a substituted ester of the formula AN—R—X, AN being a diacyl imido group, X a negative radicle of a strong acid, and R an aliphatic radicle, with hydrazine.

2. Process for the production of an amino-hydrazine of the formula $NH_2RNHNH_2$, which comprises treating a substituted ester of the formula AN—R—X, AN being a diacyl imido group, X a negative radicle of a strong acid, and R an aliphatic radicle, with a solution of hydrazine, and further treating the product with a solution of a mineral acid.

3. In the production of an amino-hydrazine of the formula $NH_2RNHNH_2$, the step which comprises reacting a substituted ester of the formula AN—R—X, AN being a diacyl imido group, X a negative radicle of a strong acid, and R an aliphatic radicle with from 10 to 20 molar proportions of hydrazine.

4. In the production of an amino-hydrazine of the formula $NH_2RNHNH_2$, R being an alkyl radicle, the step which comprises reacting a phthalimido-alkyl halide with hydrazine.

5. In the production of an amino-hydrazine of the formula $NH_2RNHNH_2$, R being an alkyl radicle, the step which comprises reacting a phthalimido-alkyl halide with from 10 to 20 molar proportions of hydrazine.

6. Process for the production of an organic hydrazine, which comprises reacting with hydrazine a substituted ester of the formula AN—R—X, AN being a diacylimido group, X a negative radicle of a strong acid, and R an aliphatic radicle, under such conditions that the radicle X is replaced by —$NH.NH_2$ and at least one of the acyl to nitrogen bonds in the group AN is broken.

7. 6-amino-hexyl hydrazine.

JAMES GORDON NAPIER DREWITT.
DONALD PETER YOUNG.

REFERENCES CITED

The following references are of record in the file of this patent:

Somner et al., Z. Anorg. Allgem. Chem., vol. 147, pages 142–155 (1925). Drew et al., J. Chem. Soc. (London). 1937, pages 16–26.